United States Patent
Han et al.

(10) Patent No.: US 12,281,405 B2
(45) Date of Patent: Apr. 22, 2025

(54) LEAD DIOXIDE-CARBON NANOTUBE ADSORPTIVE ELECTROCHEMICAL SUBMICROELECTRODE AND PREPARATION METHOD AND USE THEREOF

(71) Applicant: NANJING UNIVERSITY OF SCIENCE AND TECHNOLOGY, Nanjing (CN)

(72) Inventors: Weiqing Han, Nanjing (CN); Ruiqian Liu, Nanjing (CN); Siqi Liu, Nanjing (CN); Kajia Wei, Nanjing (CN); Wei Li, Nanjing (CN); Lu Wang, Nanjing (CN); Lianjun Wang, Nanjing (CN); Xiaodong Liu, Nanjing (CN); Jiansheng Li, Nanjing (CN); Xiuyun Sun, Nanjing (CN); Jinyou Shen, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 973 days.

(21) Appl. No.: 17/418,144

(22) PCT Filed: Sep. 2, 2020

(86) PCT No.: PCT/CN2020/112922
§ 371 (c)(1),
(2) Date: Jun. 24, 2021

(87) PCT Pub. No.: WO2021/196518
PCT Pub. Date: Oct. 7, 2021

(65) Prior Publication Data
US 2022/0332608 A1    Oct. 20, 2022

(30) Foreign Application Priority Data
Mar. 31, 2020 (CN) .......................... 202010244447.9

(51) Int. Cl.
C25D 9/04 (2006.01)
C02F 1/461 (2023.01)
(Continued)

(52) U.S. Cl.
CPC ............ C25D 9/04 (2013.01); C02F 1/46109 (2013.01); C25D 5/56 (2013.01); G01N 27/308 (2013.01);
(Continued)

(58) Field of Classification Search
None
See application file for complete search history.

(56) References Cited

U.S. PATENT DOCUMENTS 9,413,001 B2   8/2016  Zimrin et al.
2012/0067728 A1*  3/2012  Harreld ................. C25D 5/022
                                                                205/75

FOREIGN PATENT DOCUMENTS

CN   104071867 A  * 10/2014
CN   105110425 A    12/2015
(Continued)

OTHER PUBLICATIONS

S.T. Lohner et al., "Sequential Reductive and Oxidative Biodegradation of Chloroethenes Stimulated in a Coupled Bioelectro-Process," Enviromental Science and Technology, Jun. 16, 2011, pp. 6491-6497.
(Continued)

*Primary Examiner* — Louis J Rufo

(57) ABSTRACT

The present invention relates to the technical field of electrocatalytic electrode preparation, and discloses a lead dioxide-carbon nanotube adsorptive electrochemical submicroelectrode, a preparation method, and use thereof. The electrochemical submicroelectrode according to the present invention comprises multiple layers of orderly arranged
(Continued)

spherical lead dioxide submicroholes communicating with each other, where the carbon nanotubes are partially or completely inserted (in the form of twigs) in the lead dioxide hole and in the wall of the hole. The combined effect of adsorption and catalysis inside the submicroreactor effectively solves the problems of low catalytic efficiency and diffusion control associated with the conventional flat lead dioxide electrode, thus greatly improving the electrochemical catalytic performance of the electrode.

9 Claims, 6 Drawing Sheets

(51) Int. Cl.
*C25D 5/56* (2006.01)
*G01N 27/30* (2006.01)

(52) U.S. Cl.
CPC .................. *C02F 2001/46133* (2013.01); *C02F 2305/08* (2013.01)

(56) References Cited

FOREIGN PATENT DOCUMENTS

| CN | 107302102 A | * 10/2017 |
|----|-------------|-----------|
| CN | 110804750 A | 2/2020 |
| CN | 111362369 A | 7/2020 |

OTHER PUBLICATIONS

Xiezhen Zhou et al., "A multi-walled carbon nanotube electrode based on porous Graphite-RuO2 in electrochemical filter for pyrrole degradation," Chemical Engineering Journal, Aug. 10, 2017, pp. 956-964.

* cited by examiner

LEAD DIOXIDE-CARBON NANOTUBE ADSORPTIVE ELECTROCHEMICAL SUBMICROELECTRODE AND PREPARATION METHOD AND USE THEREOF

BACKGROUND

Technical Field

The present invention relates to the technical field of electrocatalytic electrode preparation, and more specifically, to a lead dioxide-carbon nanotube adsorptive electrochemical submicroelectrode, a preparation method, and use thereof in the treatment of low-concentration and highly toxic pollutants.

Related Art

Due to the unique advantages such as high efficiency and environmental friendliness, electrochemical oxidation has attracted wide attention in the field of treatment of refractory organic wastewater. Lead dioxide is a commonly used electrode material, which has attracted wide attention due to its low price, simple preparation, and good catalytic activity. Chinese Patent Application Publication No. CN107302102A discloses a method for preparing a three-dimensional ordered porous lead dioxide membrane electrode by template electrodeposition in the related art. An antimony-doped tin dioxide intermediate layer is prepared on a porous titanium substrate by the sol-gel method; then monodispersed polystyrene microspheres were used as a template, and assembled on the intermediate layer by natural settlement; a lead dioxide active layer is prepared in the gaps between the template by electrodeposition; and finally the template is dissolved to obtain a lead dioxide membrane electrode with a porous structure. The lead dioxide membrane electrode in the related art has a three-dimensional ordered porous structure, a large specific surface area, many electrochemically active sites, and a large membrane flux, and overcomes the defects of failure to be used in a filter-type electrochemical system due to the dense structure of traditional lead dioxide electrode, thus having a great value of application in the field of electrochemical catalysis.

However, there are defects such as low mass transfer rate and high energy consumption in a traditional electrochemical system due to the limitation from diffusion control, and these problems are difficult to solve in traditional electrochemical systems. Although the above-mentioned electrodes have a greatly improved mass transfer rate compared with traditional lead dioxide electrodes, there is still a bottleneck in diffusion control. In recent years, studies have found that adsorptive electrodes that couple electrocatalysis and adsorption can significantly enhance mass transfer and promote electron transfer (S. T. Lohner, D. Becker, K.-M. Mangold, A. Tiehm, Sequential Reductive and Oxidative Biodegradation of Chloroethenes Stimulated in a Coupled Bioelectro-Process. *Environmental Science & Technology,* 2011, 45, 6491-6497).

It has been reported in the previous literature that a carbon nanotube-ruthenium dioxide adsorptive electrode can be obtained by introducing a layer of carbon nanotubes on a prepared ruthenium dioxide active layer through filtration, solvent evaporation, and high-temperature sintering. The electrode comprises a substrate, a ruthenium dioxide catalytic layer, and a carbon nanotube adsorptive layer, can improve the mass transfer rate of organic matter on the electrode surface, and achieve good results in the treatment of low-concentration, refractory pollutants in the water (A multi-walled carbon nanotube electrode based on porous Graphite-$RuO_2$ in electrochemical filter for pyrrole degradation. Chemical Engineering Journal, 2017, 330, 956-964). However, the adsorptive electrode of this structure simply superimposes the adsorptive layer and the catalytic layer. The contact area between the carbon nanotube and ruthenium dioxide is small. After the adsorption is saturated, only the organic matter on a very thin layer of carbon nanotube adsorptive layer adjacent to the ruthenium dioxide catalytic layer can be desorbed in situ by electrocatalysis. After filtration and solvent evaporation, the carbon nanotube adsorptive layer has an unduly dense structure, the specific surface area drops sharply, and the adsorption capacity decreases. In addition, the carbon nanotube adsorptive layer prepared by solvent evaporation and high-temperature sintering is adhered to the surface of ruthenium dioxide merely by means of physical action, and tend to fall off during the electrolysis process. Moreover, as a typical active electrode, ruthenium dioxide has low oxygen evolution potential and poor catalytic activity, and is not suitable for use in the treatment of refractory organics. Therefore, such an adsorptive electrode has small adsorption capacity, incomplete in-situ desorption, unstable adsorptive layer, low catalytic efficiency, and poor electrode life.

SUMMARY

1. Problem to be Solved

In view of the problem in the prior art that the carbon nanotube physically adhered to the electrode surface has low adsorption capacity and is unstable during the electrolysis process, the present invention provides a lead dioxide-carbon nanotube adsorptive electrochemical submicroelectrode and a preparation method and use thereof. Carbon nanotubes are inserted in the three-dimensional ordered porous lead dioxide electrode, so that the carbon nanotubes are allowed to be evenly distributed to fully exert an adsorption effect. Moreover, the stability of the electrode is improved since the carbon nanotubes are uneasy to fall off during the electrolysis process, so the electrode can be used repeatedly. The combination of adsorption and catalysis improves the electrochemical oxidation efficiency and reduces the energy consumption.

2. Technical Solution

In order to solve the above problems, the technical solutions adopted by the present invention are as follows:

A lead dioxide-carbon nanotube adsorptive electrochemical submicroelectrode is provided. The electrochemical submicroelectrode comprises multiple layers of orderly arranged spherical lead dioxide submicroholes communicating with each other, where the carbon nanotubes are partially or completely inserted (in the form of twigs) in the lead dioxide hole and in the wall of the hole. Because the carbon nanotubes are partially or completely inserted into the lead dioxide hole, they have good stability and are uneasy to fall off. Each lead dioxide hole and the carbon nanotube therein form an electrochemical submicroelectrode. The carbon nanotubes promote the organic matter in the bulk solution to diffuse into the electrochemical submicroelectrode by active adsorption. Then the pollutants entering the submicroreactor are oxidized and removed by the hydroxyl radicals generated on the surface of lead dioxide. The active adsorption by carbon nanotubes can significantly improve the mass transfer rate, enhance the removal of pollutants, and reduce the treatment cost in the electrochemical process. The combination of adsorption and catalysis in the electrochemical submicroelectrode effectively improves the efficiency of electrochemical oxidation.

Preferably, the size of the hole is 0.3-10 μm.

The present invention also provides a method for preparing the electrochemical submicroelectrode. A method for preparing a lead dioxide-carbon nanotube adsorptive electrochemical submicroelectrode includes: settling a spherical template adhered with carbon nanotubes down to a substrate to form a film, then preparing a lead dioxide active layer in the gaps between the spherical template by electrodeposition, and finally dissolving the template to prepare the lead dioxide-carbon nanotube adsorptive electrochemical submicroelectrode. In the process of preparing the lead dioxide catalytic layer, the hard template and carbon nanotubes are simultaneously introduced. After the hard template is removed, spherical holes communicating with each other are formed in the lead dioxide active layer, and the carbon nanotubes are directly retained and fixed in internal holes of the active layer, to become more uniform, stable, and uneasy to fall off.

Preferably, the substrate is one selected from antimony tin oxide conductive glass, a titanium plate, foamed titanium, foamed nickel, and a graphite plate.

Preferably, the spherical template is one or more selected from polystyrene microspheres and polyacrylic acid microspheres.

Preferably, the preparation method includes the following steps:

Step 1: cleaning antimony tin oxide conductive glass; mixing a polystyrene dispersion and a carbon nanotube dispersion; and heating, to obtain a mixed dispersion with carbon nanotubes adhered to the surface of the polystyrene microsphere template;

Step 2: dripping the mixed dispersion in Step 1 on the surface of the antimony tin oxide conductive glass, and drying, to allow the polystyrene microsphere template adhered with carbon nanotubes to form a thin film;

Step 3: preparing a lead dioxide active layer in the gaps between the polystyrene microsphere template in the film in Step 2 by electrodeposition; and Step 4: dissolving the polystyrene microsphere template in an organic solvent to obtain the lead dioxide-carbon nanotube adsorptive electrochemical submicroelectrode.

Preferably, the weight ratio of polystyrene and carbon nanotube in the mixed dispersion in Step 1 is (1-3):1.

Preferably, the weight fractions of the polystyrene dispersion and the carbon nanotube dispersion in Step 1 are the same, and within the range of 0.1 to 1%.

Preferably, the heating temperature after mixing the polystyrene and the carbon nanotube in Step 1 is 80-180° C., and the heating time is 10-60 min.

Preferably, in Step 2, the mixed dispersion is dripped on the surface of the antimony tin oxide conductive glass in an amount of 0.1-1 mL/cm².

Preferably, the drying temperature in Step 2 is 40-80° C., and the drying time is 0.5-2 hrs.

Preferably, in Step 3, the electrodeposition current is 5-30 mA/cm$^{-2}$, the electrodeposition time is 5-30 min, and the temperature is 30-70° C.

Preferably, the organic solvent in Step 4 is one selected from tetrachloroethane, styrene, isopropane, benzene, chloroform, xylene, toluene, carbon tetrachloride, and methyl ethyl ketone.

The present invention also provides use of the lead dioxide-carbon nanotube adsorptive electrochemical submicroelectrode in removing pollutants in water.

3. Beneficial Effects

Compared with the prior art, the present invention has the following beneficial effects:

(1) The lead dioxide-carbon nanotube adsorptive electrochemical submicroelectrode of the present invention comprises multiple layers of orderly arranged spherical lead dioxide submicroholes communicating with each other, where the carbon nanotubes are evenly intersectedly distributed in the form of twigs in the lead dioxide hole and the wall of the hole. The carbon nanotubes are uneasy to fall off and have good stability. The lead dioxide submicrohole greatly increases the electrochemical active area of the electrode, and the narrow hole size effectively increases the local concentration of free hydroxyl radicals in the hole. The introduction of carbon nanotubes provides a large number of adsorption sites for the electrode, which significantly enhances the active adsorption of pollutants in the bulk solution on the electrode surface. The combined effect of adsorption and catalysis inside the submicroreactor effectively solves the problems of low catalytic efficiency and diffusion control associated with the conventional flat lead dioxide electrode, thus greatly improving the electrochemical catalytic performance of the electrode. Moreover, the pollutants adsorbed on the carbon nanotubes arrest the attack of active oxidants such as hydroxyl radicals on the carbon nanotube, to enhance the life of the adsorptive electrode.

(2) In the present invention, the carbon nanotubes are adhered to the spherical template, and then settled down to the substrate to form a film. Then the lead dioxide active layer is prepared in the gaps between the spherical template by electrodeposition. Finally the template is dissolved to obtain the lead dioxide-carbon nanotube adsorptive electrochemical submicroelectrode. In this way, the carbon nanotubes are ensured to be partially or completely inserted in the lead dioxide active layer, making the binding of the two stronger, and ensuring the stability of the electrode during repeated use.

(3) By controlling the ratio of the spherical template to the carbon nanotube and the conditions for depositing lead dioxide, the carbon nanotubes are evenly and intersectedly inserted in the lead dioxide active layer in the present invention, thus avoiding the problem of decreased adsorption capacity caused by the dense carbon nanotubes.

DETAILED DESCRIPTION

Figure 1:
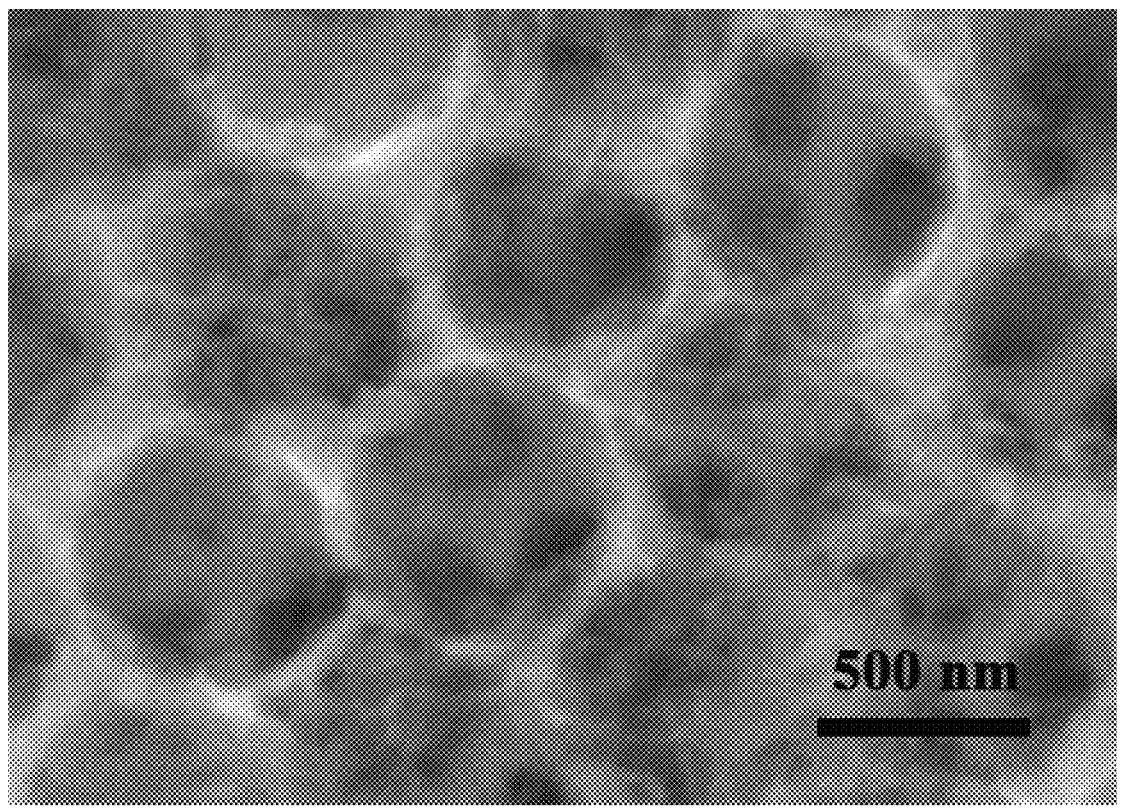
FIG. 1 is an SEM image of the lead dioxide-carbon nanotube adsorptive electrochemical submicroelectrode obtained in Example 1 of the present invention.

Unless otherwise defined, all technical and scientific terms used herein have the same meaning as commonly understood by those skilled in the technical field of the present invention. The term "and/or" as used herein includes any and all combinations of one or more related listed items.

Where no specific conditions are given in the examples, conventional conditions or conditions recommended by the manufacturer are followed. The reagents or instruments for which no manufacturers are noted are all common products commercially available from the market.

As used herein, the term "about" is used to provide flexibility and imprecision related to a given term, metric, or value. Those skilled in the art can easily determine the degree of flexibility of specific variables.

The concentrations, amounts, and other values are presented in a range format herein. It should be understood that such a range format is used only for convenience and brevity, and should be flexibly interpreted as including not only the values explicitly stated as the limits of the range, but also all individual values or subranges covered within the range, as if each value and subrange are explicitly stated. For example, a numerical range of about 1 to about 4.5 should be interpreted as not only including the explicitly stated limit values of 1 to about 4.5, but also including individual numbers (such as 2, 3, 4) and subranges (such as 1 to 3, 2 to 4). The same principle applies to a range that only states one value, for example "less than about 4.5" should be interpreted as including all the above-mentioned values and ranges. In addition, the interpretation should apply regardless of the range or the breadth of features described.

The present invention will be further described below with reference to specific embodiments.

Example 1

The antimony tin oxide conductive glass was cut into a size of 5*5 cm, and washed with acetone, ethanol and water. A 0.25 wt % dispersion of polystyrene microspheres with a diameter of 0.6 μm and a 0.25% dispersion of carbon nanotubes were mixed at a weight ratio of 2:1, and then heated in a water bath at 80° C. for 1 hr. 2.5 mL of the mixed dispersion was dripped onto the cleaned antimony tin oxide conductive glass. Then the sample was dried in an oven at 40° C., to form a film of polystyrene microspheres adhered with carbon nanotubes on the surface of antimony tin oxide conductive glass. The prepared sample was used as the anode, a stainless steel plate of the same size was used as the cathode, the distance between the two electrodes was controlled to 0.5 cm. The magnetic stirrer was turned on, and constant current electrodeposition on the anode was carried out in an electrodeposition solution. The electrodeposition solution was an aqueous solution containing 0.5 mol/L lead nitrate and 0.2 mol/L nitric acid, the current density was 5 mAcm$^{-2}$, the electrodeposition time was 30 min, and the temperature was controlled to 55° C. Then the anode was removed, rinsed with deionized water, and soaked in toluene for 8 hrs to dissolve the polystyrene microspheres. The sample was removed, rinsed, and dried to obtain the lead dioxide-carbon nanotube adsorptive electrochemical submicroelectrode.

FIG. 1 is an SEM image of the lead dioxide-carbon nanotube adsorptive electrochemical submicroelectrode obtained in this example. It can be seen from FIG. 1 that after the polystyrene microspheres are dissolved, the lead dioxide-carbon nanotube composite active layer can retain a complete inverse opal-like structure. It can be seen that the carbon nanotubes and lead dioxide in the skeleton are well combined to form a structure similar to asbestos. The edge of the skeleton is burr-like, which increases the exposure of the carbon nanotubes and greatly increases the adsorption capacity and specific surface area of the electrode, thus facilitating the adsorption of pollutants on the catalytic surface of the electrode.

Comparative Example 1A—Conventional Flat Lead Dioxide Electrode (CF-PbO$_2$)

According to A. Ansari, D. Nematollahi, A comprehensive study on the electrocatalytic degradation, electrochemical behavior and degradation mechanism of malachite green using electrodeposited nanostructured beta-PbO$_2$ electrodes, Water Res, 144 (2018) 462-473, a conventional flat lead dioxide electrode (CF-PbO$_2$) was prepared. The specific steps were as follows. The antimony tin oxide conductive glass was cut into a size of 5*5 cm, and washed with acetone, ethanol and water. The treated conductive glass was used as the anode, a stainless steel plate of the same size was used as the cathode, the distance between the two electrodes was controlled to 0.5 cm. The magnetic stirrer was turned on, and constant current electrodeposition on the anode was carried out in an electrodeposition solution. The electrodeposition solution was an aqueous solution containing 0.5 mol/L lead nitrate and 0.2 mol/L nitric acid, the current density was 5 mAcm$^{-2}$, the electrodeposition time was 30 min, and the temperature was controlled to 55° C. Then the anode was removed, and rinsed with deionized water. The sample was removed, rinsed, and dried to obtain a conventional flat lead dioxide electrode.

Comparative Example 1B—Three Dimensional Ordered Porous Lead Dioxide Electrode (3D-PbO$_2$)

According to Liu S, Wang Y, Zhou X, et al. Improved degradation of the aqueous flutriafol using a nanostructure macroporous PbO$_2$ as reactive electrochemical membrane [J]. Electrochimica Acta, 2017, 253: 357-367, a three dimensional ordered porous lead dioxide electrode (3D-PbO$_2$) was prepared. The specific steps were as follows. The antimony tin oxide conductive glass was cut into a size of 5*5 cm, and washed with acetone, ethanol and water. 2.5 mL of a 0.17 wt % dispersion of polystyrene microspheres with a diameter of 0.6 μm was dripped onto the cleaned antimony tin oxide conductive glass. Then the sample was dried in an oven at 40° C., to form a film of polystyrene microspheres on the surface of antimony tin oxide conductive glass. The prepared sample was used as the anode, a stainless steel plate of the same size was used as the cathode, the distance between the two electrodes was controlled to 0.5 cm. The magnetic stirrer was turned on, and constant current electrodeposition on the anode was carried out in an electrodeposition solution. The electrodeposition solution was an aqueous solution containing 0.5 mol/L lead nitrate and 0.2 mol/L nitric acid, the current density was 5 mAcm$^{-2}$, the electrodeposition time was 30 min, and the temperature was controlled to 55° C. Then the anode was removed, rinsed with deionized water, and soaked in toluene for 8 hrs to dissolve the polystyrene microspheres. The sample was removed, rinsed, and dried to obtain a three dimensional ordered porous lead dioxide electrode.

controlled to 55° C. Then the anode was removed, and rinsed with deionized water. 2.5 mL of a 0.08% dispersion of carbon nanotubes (containing 0.5% polyacrylonitrile binder) was dripped on the prepared sample, and then the sample was dried in an oven at 60° C. to prepare a lead dioxide-carbon nanotube adsorptive electrode.

Table 1 shows the specific surface areas of the lead dioxide-carbon nanotube adsorptive electrochemical submicroelectrode (PbO$_2$ submicroreactor) prepared in Example 1 and CF-PbO$_2$, 3D-PbO$_2$, CNTs/PbO$_2$ and PbO$_2$-CNTs prepared in Comparative Examples 1A-1D tested by BET.

TABLE 1

Specific surface area of the samples in Example 1 and Comparative Examples 1A-1D

| Sample | CF-PbO$_2$ | 3D-PbO$_2$ | CNTs/PbO$_2$ | PbO$_2$-CNTs | PbO$_2$ submicroreactor |
|---|---|---|---|---|---|
| Specific surface area (m$^2$/g) | 0.89 | 36.51 | 2.96 | 79.62 | 76.56 |

Comparative Example 1C—Carbon Nanotube/Lead Dioxide Composite Electrode (CNTs/PbO$_2$)

The specific steps for preparing a carbon nanotube/lead dioxide composite electrode (CNTs/PbO$_2$) were as follows. The antimony tin oxide conductive glass was cut into a size of 5*5 cm, and washed with acetone, ethanol and water. 2.5 mL of a 0.08% dispersion of carbon nanotubes was dripped onto the cleaned antimony tin oxide conductive glass. Then the sample was dried in an oven at 40° C., to form a film of carbon nanotubes on the surface of antimony tin oxide conductive glass. The prepared sample was used as the anode, a stainless steel plate of the same size was used as the cathode, the distance between the two electrodes was controlled to 0.5 cm. The magnetic stirrer was turned on, and constant current electrodeposition on the anode was carried out in an electrodeposition solution. The electrodeposition solution was an aqueous solution containing 0.5 mol/L lead nitrate and 0.2 mol/L nitric acid, the current density was 5 mAcm$^{-2}$, the electrodeposition time was 30 min, and the temperature was controlled to 55° C. Then the anode was removed, and rinsed with deionized water, to obtain a carbon nanotube/lead dioxide composite electrode.

Comparative Example 1D—Lead Dioxide-Carbon Nanotube Adsorptive Electrode (PbO$_2$-CNTs)

According to Zhou X, Liu S, Xu A, et al. A multi-walled carbon nanotube electrode based on porous Graphite-RuO$_2$ in electrochemical filter for pyrrole degradation[J]. Chemical Engineering Journal, 2017, 330: 956-964, a lead dioxide-carbon nanotube adsorptive electrode (PbO$_2$-CNTs) was prepared. The specific preparation steps were as follows. The antimony tin oxide conductive glass was cut into a size of 5*5 cm, and washed with acetone, ethanol and water. The treated conductive glass was used as the anode, a stainless steel plate of the same size was used as the cathode, the distance between the two electrodes was controlled to 0.5 cm. The magnetic stirrer was turned on, and constant current electrodeposition on the anode was carried out in an electrodeposition solution. The electrodeposition solution was an aqueous solution containing 0.5 mol/L lead nitrate and 0.2 mol/L nitric acid, the current density was 5 mAcm$^{-2}$, the electrodeposition time was 30 min, and the temperature was It can be seen from the data in Table 1 that when no carbon nanotube and polystyrene template are not introduced in Comparative Example 1A, the specific surface area of CF-PbO$_2$ is small and is only 0.89 m$^2$/g. When only the polystyrene template is introduced to produce three-dimensional ordered pores, the specific surface area of 3D-PbO$_2$ in Comparative Example 1B is greatly increased to 36.51 m$^2$/g. In Comparative Example 1C, when only carbon nanotubes are introduced, the specific surface area of the carbon nanotube/lead dioxide composite electrode (CNTs/PbO$_2$) is increased to 2.96 m$^2$/g. Since most of the carbon nanotubes contributing to the specific surface area are covered by lead dioxide, resulting in a small specific surface area. In Comparative Example 1D, by simply adhering the carbon nanotubes to the surface of the lead dioxide electrode, the specific surface area of the lead dioxide-carbon nanotube adsorptive electrode (PbO$_2$-CNTs) is increased to 79.62 m$^2$/g. Although the specific surface area of the electrode is greatly improved, it is achieved only by simply adhering the carbon nanotubes to the surface of the electrode. The electrode prepared by this method has a short life and the carbon nanotube adhered to the surface is easy to fall off. In Example 1, when the polystyrene template is used to introduce both the porous structure and the carbon nanotubes, the specific surface area reaches 76.56 m$^2$/g. It can be seen that although part of the carbon nanotubes is covered by lead dioxide, the specific surface area still maintains a high value due to the protection from the template. Because the wall of the hole is formed by carbon nanotube and lead dioxide, the life of the electrode is prolonged and the carbon nanotube is prevented from falling off.

Figure 2:
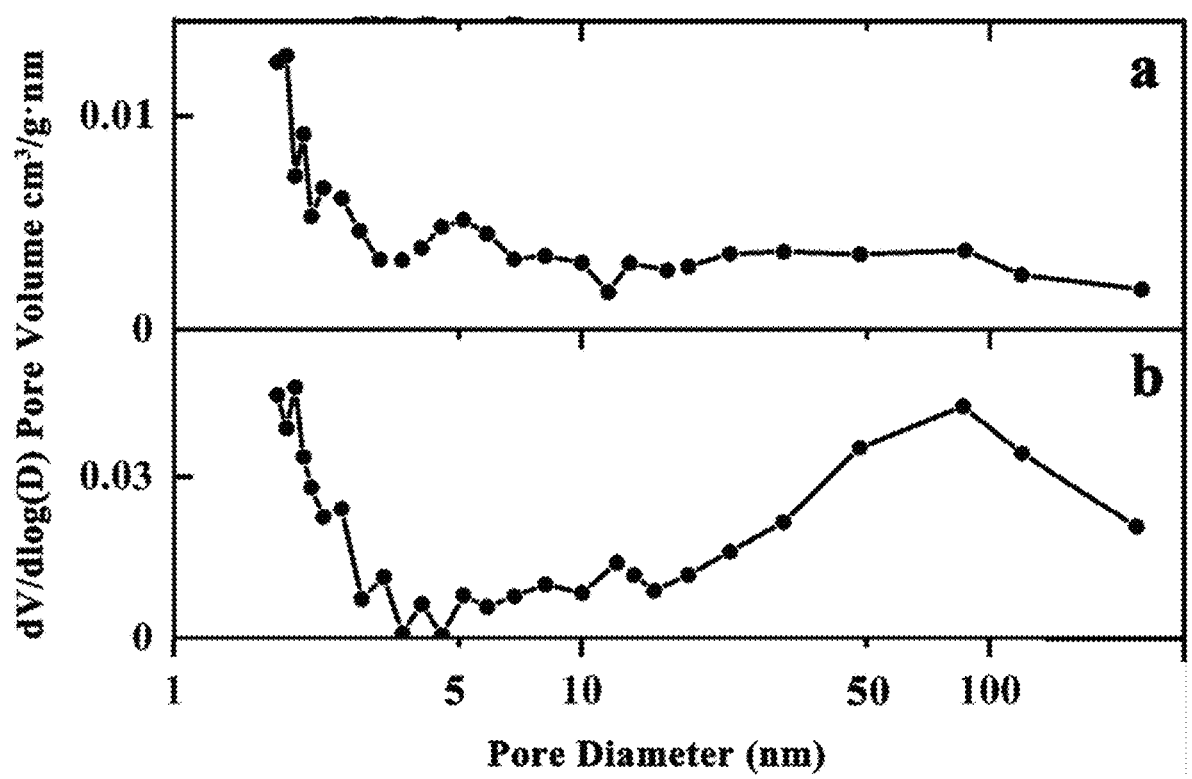
FIG. 2 is a diagram showing the hole size distribution of (a) a lead dioxide electrode prepared by a traditional method and (b) the lead dioxide-carbon nanotube adsorptive electrochemical submicroelectrode obtained in Example 1 of the present invention.

FIG. 2 is a diagram showing the hole size distribution of (a) the CF-PbO$_2$ electrode obtained in Comparative Example 1A and (b) the lead dioxide-carbon nanotube adsorptive electrochemical submicroelectrode obtained in Example 1 of the present invention. It can be seen from FIG. 2 that the obtained lead dioxide-carbon nanotube adsorptive electrochemical submicroelectrode has more micropores and mesopores, which are beneficial to the increase of the specific surface area of the electrode.

Example 2

The adsorptions for ferulic acid by the lead dioxide-carbon nanotube adsorptive electrochemical submicroelectrode (PbO$_2$ submicroreactor) prepared in Example 1 and CF-PbO$_2$, 3D-PbO$_2$, CNTs/PbO$_2$ and PbO$_2$-CNTs prepared in Comparative Examples 1A-1D were compared.

The specific method was as follows. 300 mL of simulant wastewater containing 40 mg/L ferulic acid was prepared, and the prepared electrode and a stainless steel plate were respectively used as the anode and cathode respectively. The size of the anode was 5 cm*5 cm, the geometric surface area was 25 cm$^2$, and the thickness was 0.1 cm. The geometric sizes of the cathode were the same as those of the anode. The anode and cathode were connected by a titanium wire to a positive and negative electrode of a power supply respectively. Ferulic acid was adsorbed and the adsorption performances of several electrodes for ferulic acid were compared.

Figure 3:
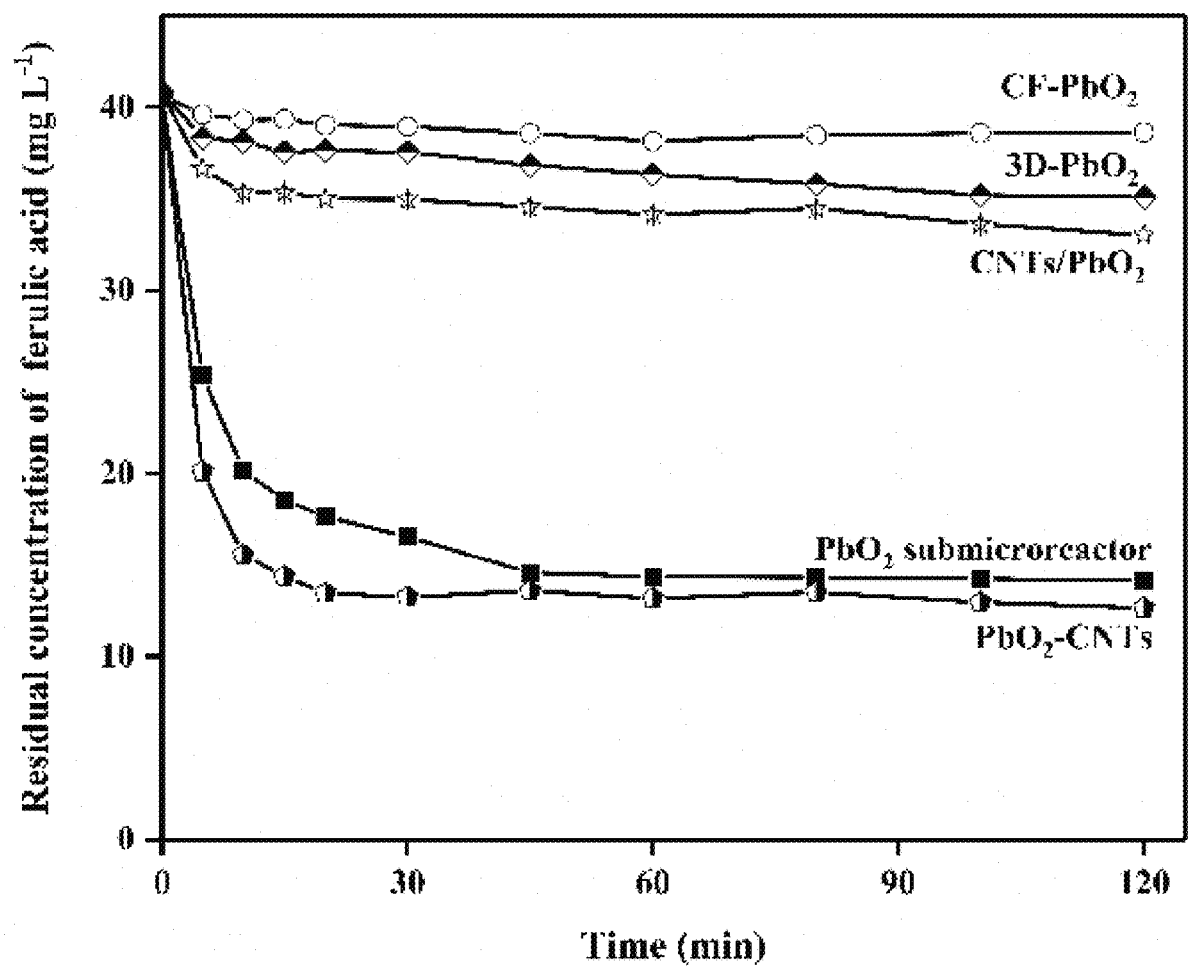
FIG. 3 shows an adsorption equilibrium diagram for ferulic acid by the lead dioxide-carbon nanotube adsorptive electrochemical submicroelectrode ($PbO_2$ submicroreactor) prepared in Example 1 and CF-$PbO_2$, 3D-$PbO_2$, CNTs/$PbO_2$ and $PbO_2$-CNTs prepared in Comparative Examples 1A-1D.

FIG. 3 shows an adsorption equilibrium diagram for ferulic acid by the lead dioxide-carbon nanotube adsorptive electrochemical submicroelectrode prepared in Example 1 and CF-PbO$_2$, 3D-PbO$_2$, CNTs/PbO$_2$ and PbO$_2$-CNTs prepared in Comparative Examples 1A-1D. It can be seen from FIG. 3 that within 120 min, where no carbon nanotubes are introduced, the adsorption capacities of CF-PbO$_2$ and 3D-PbO$_2$ are very small. After the introduction of carbon nanotubes, the adsorption capacity of CNTs/PbO$_2$ is still very small, because the carbon nanotubes are almost completely covered by lead dioxide. The concentration of the ferulic acid solution is decreased from 40 mg/L to 16 mg/L or less at about 50 min by the lead dioxide-carbon nanotube adsorptive electrochemical submicroelectrode and PbO$_2$-CNTs merely by virtue of adsorption. This indicates that the carbon nanotubes in the lead dioxide-carbon nanotube adsorptive electrochemical submicroelectrode obtained in Example 1 of the present invention is not affected by lead dioxide coverage, and the adsorption is still obvious.

Example 3

300 mL of simulant wastewater containing 40 mg/L ferulic acid was prepared, and 0.05M Na$_2$SO$_4$ was added as an electrolyte. The lead dioxide-carbon nanotube adsorptive electrochemical submicroelectrode prepared in Example 1 and the CF-PbO$_2$, 3D-PbO$_2$, CNTs/PbO$_2$ and PbO$_2$-CNTs prepared in Comparative Examples 1A-1D were respectively used as the anode, and a stainless steel plate was used as the cathode to degrade ferulic acid. The current density was controlled to 20 mA/cm$^2$, and the degradation performances of the five electrodes for ferulic acid were compared.

Figure 4:
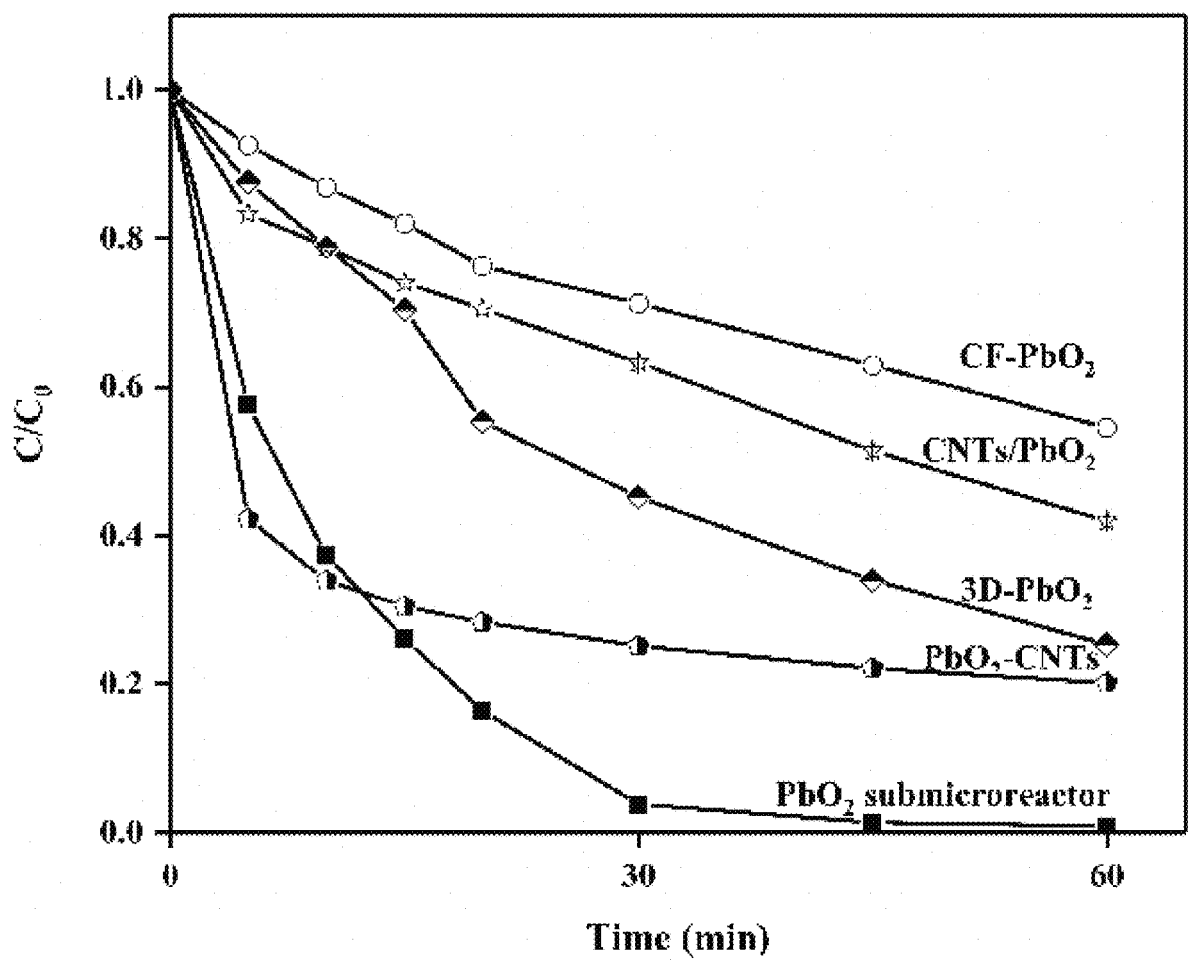
FIG. 4 shows the removal efficiency of ferulic acid over time by the lead dioxide-carbon nanotube adsorptive electrochemical submicroelectrode ($PbO_2$ submicroreactor) prepared in Example 1 and CF-PbO$_2$, 3D-PbO$_2$, CNTs/PbO$_2$ and PbO$_2$-CNTs prepared in Comparative Examples 1A-1D of the present invention.

FIG. 4 shows the removal efficiency of ferulic acid over time by the lead dioxide-carbon nanotube adsorptive electrochemical submicroelectrode prepared in Example 1 and CF-PbO$_2$, 3D-PbO$_2$, CNTs/PbO$_2$ and PbO$_2$-CNTs prepared in Comparative Examples 1A-1D of the present invention. It can be seen from FIG. 4 that after 1 hr of electrolysis, the lead dioxide-carbon nanotube adsorptive electrochemical submicroelectrode has better electrocatalytic performance, and ferulic acid is almost completely removed. In contrast, the removal efficiency by CF-PbO$_2$, 3D-PbO$_2$, CNTs/PbO$_2$ and PbO$_2$-CNTs is 45%, 75%, 60% and 80% respectively. It is to be noted that although the specific surface area of PbO$_2$-CNTs is greater than that of the lead dioxide-carbon nanotube adsorptive electrochemical submicroelectrode prepared in Example 1, the carbon nanotubes in PbO$_2$-CNTs continue to fall off with the elapse of the electrolysis time, which limits the removal rate of ferulic acid.

Example 4

300 mL of simulant wastewater containing 40 mg/L ferulic acid was prepared, and 0.05M Na$_2$SO$_4$ was added as an electrolyte. At a current density of 20 mA/cm$^2$, the lead dioxide-carbon nanotube adsorptive electrochemical submicroelectrode was repeatedly used 10 times to degrade ferulic acid to investigate the in-situ desorption capacity of the electrode adsorption layer.

Figure 5:
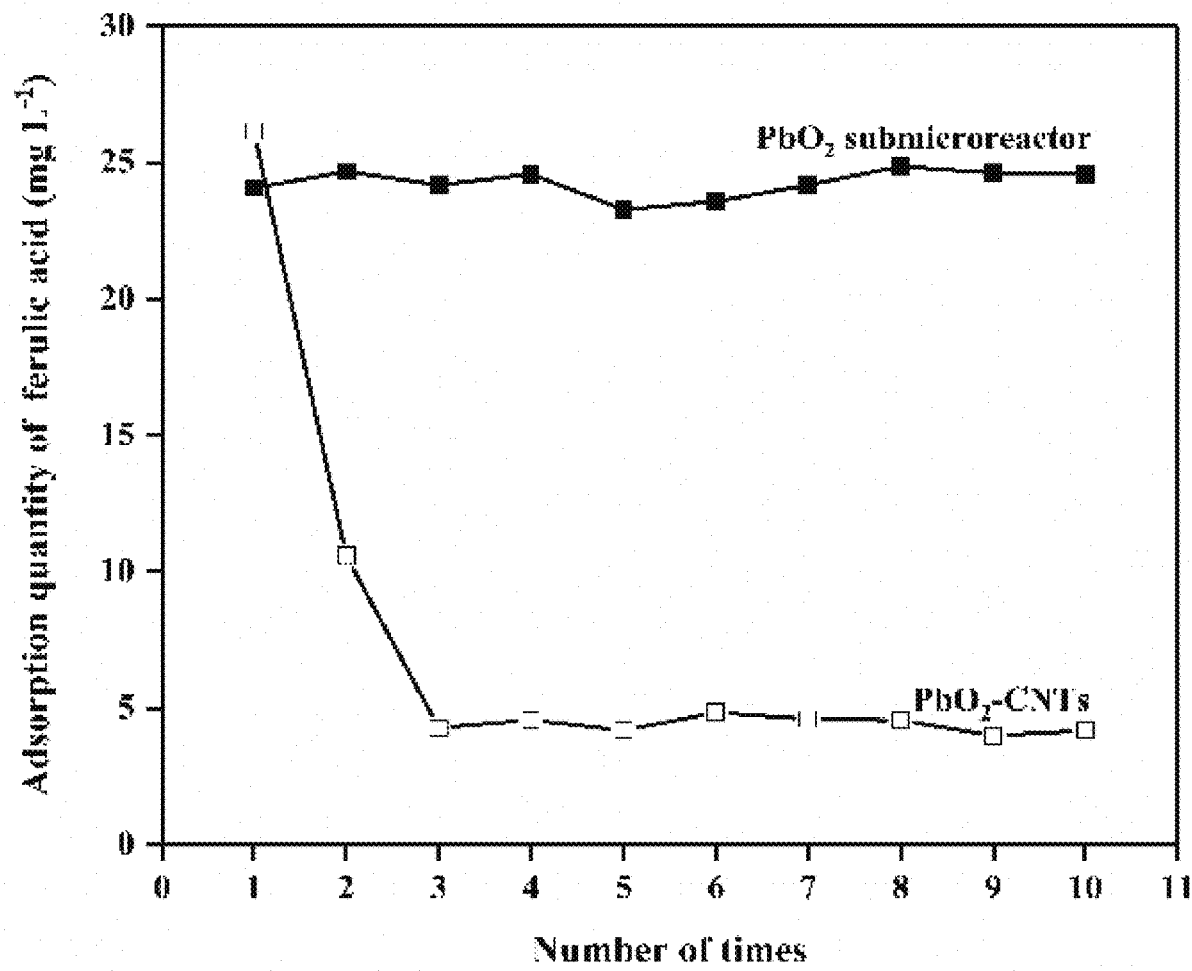
FIG. 5 is a graph showing the repeated adsorption of ferulic acid by the lead dioxide-carbon nanotube adsorptive electrochemical submicroelectrode (PbO$_2$ submicroreactor) prepared in Example 1 and PbO$_2$-CNTs prepared in Comparative Example 1D of the present invention.

FIG. 5 is a graph showing the repeated adsorption of ferulic acid by the lead dioxide-carbon nanotube adsorptive electrochemical submicroelectrode prepared in Example 1 and PbO$_2$-CNTs prepared in Comparative Example 1D of the present invention. It can be seen that after 10 times of repeated use, the adsorption effect of PbO$_2$-CNTs decreases significantly, and the adsorption effect is almost 0 at the third time. This may be caused by the falling off of carbon nanotubes during the electrolysis process. However, the adsorption effect of lead dioxide-carbon nanotube adsorptive electrochemical submicroelectrode has no obvious decrease after 10 times of repeated use, indicating that the lead dioxide-carbon nanotube adsorptive electrochemical submicroelectrode prepared in the present invention can effectively adsorb organic pollutants and oxidize them in situ.

Example 5

300 mL of simulant wastewater containing 40 mg/L Bisphenol-A, salicylic acid or carbamazepine was respectively prepared. The lead dioxide-carbon nanotube adsorptive electrochemical submicroelectrode was used as the anode and a stainless steel plate was used as the cathode. Bisphenol A, salicylic acid, and carbamazepine were adsorbed respectively, and the adsorption performances of the electrode for various pollutants were compared.

Figure 6:
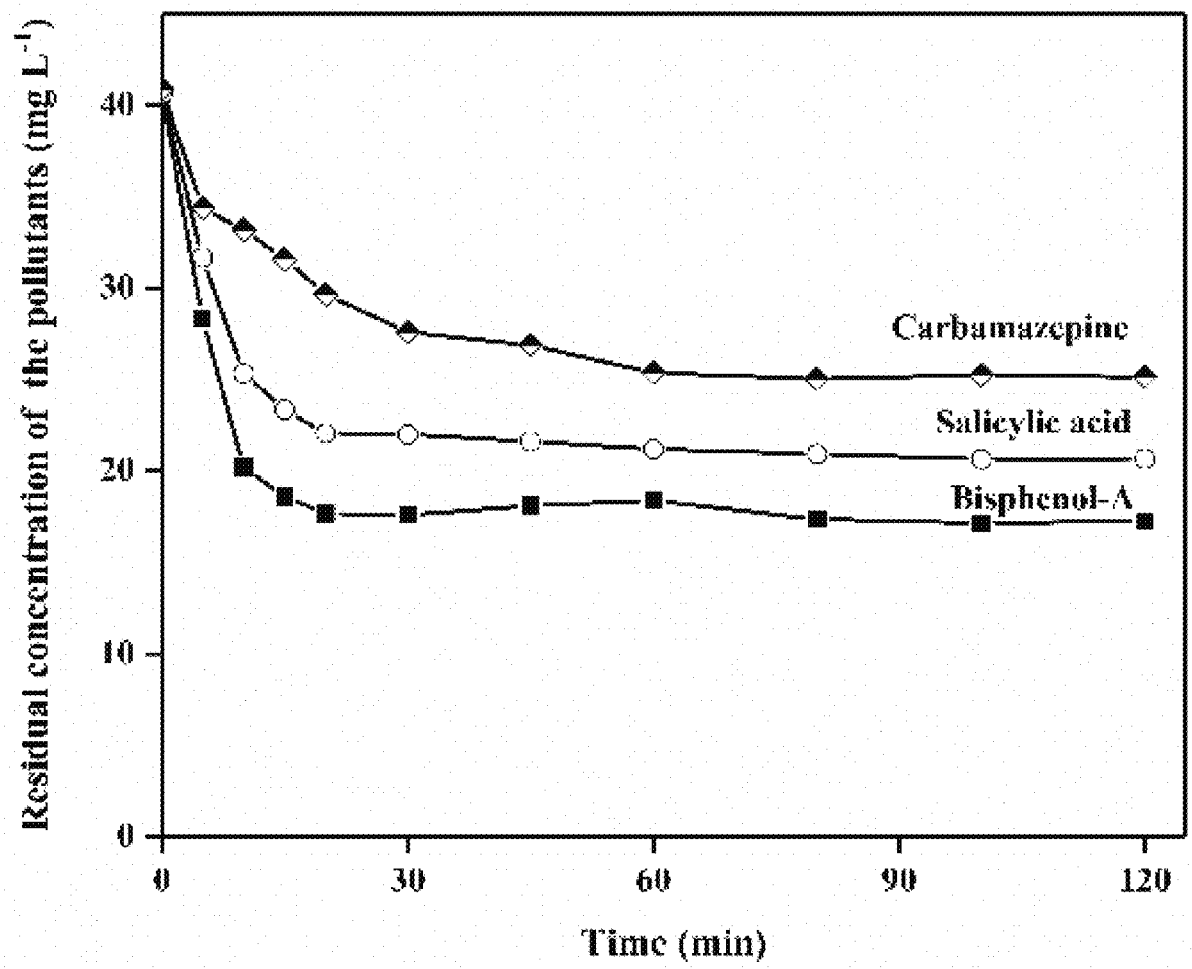
FIG. 6 shows an adsorption equilibrium diagram of bisphenol A, salicylic acid, and carbamazepine by the lead dioxide-carbon nanotube adsorptive electrochemical submicroelectrode (PbO$_2$ submicroreactor) prepared in Example 1 of the present invention.

FIG. 6 shows an adsorption equilibrium diagram of bisphenol A, salicylic acid, and carbamazepine by the lead dioxide-carbon nanotube adsorptive electrochemical submicroelectrode (PbO$_2$ submicroreactor) prepared in Example 1 of the present invention. It can be seen from FIG. 6 that within 60 min, the concentration of the Bisphenol-A, salicylic acid and carbamazepine solution is decreased from 40 mg/L to 25 mg/L by the lead dioxide-carbon nanotube adsorptive electrochemical submicroelectrode merely by virtue of adsorption. This indicates that the lead dioxide-carbon nanotube adsorptive electrochemical submicroelectrode obtained in Example 1 of the present invention has good adsorption for various pollutants.

In some embodiments, a spherical template with a size of any value from 0.3 to 10 µm, excluding 0.6 µm, is also used to prepare lead dioxide-carbon nanotube adsorptive electrochemical submicroelectrodes with various hole sizes following the same method as that in Example 1.

In some embodiments, the template and carbon nanotube are introduced at a weight ratio of polystyrene to carbon nanotube of (1-3):1, excluding 1:1, to prepare lead dioxide-carbon nanotube adsorptive electrochemical submicroelectrodes having various amounts of inserted carbon nanotubes following the same method as that in Example 1.

In some embodiments, a polystyrene dispersion and a carbon nanotube dispersion of the same concentration in percent by weight in the range of 0.1 to 1% are used to prepare lead dioxide-carbon nanotube adsorptive electrochemical submicroelectrodes having various densities of holes and carbon nanotubes following the same method as that in Example 1.

In some embodiments, after the polystyrene and carbon nanotube are mixed, the heating temperature is 80-180° C. and the heating time is 10-60 min, to prepare lead dioxide-carbon nanotube adsorptive electrochemical submicroelectrodes following the same method as that in Example 1.

In some embodiments, the mixed dispersion of polystyrene and carbon nanotube is dripped to the surface of the antimony tin oxide conductive glass in an amount of 0.1-1 mL/cm$^2$, to prepare lead dioxide-carbon nanotube adsorptive electrochemical submicroelectrodes following the same method as that in Example 1.

In some embodiments, after the mixed dispersion is dripped on the cleaned antimony tin oxide conductive glass, the drying temperature is 40-80° C., and the drying time is 0.5-2 hrs, to prepare lead dioxide-carbon nanotube adsorptive electrochemical submicroelectrodes following the same method as that in Example 1.

In some embodiments, during the preparation of the lead dioxide active layer, the electrodeposition current is 5-30 mA/cm$^{-2}$, the electrodeposition time is 5-30 min and the temperature is 30-70° C., to prepare lead dioxide-carbon nanotube adsorptive electrochemical submicroelectrodes following the same method as that in Example 1.

In some embodiments, the organic solvent is one selected from tetrachloroethane, styrene, isopropane, benzene, chloroform, xylene, toluene, carbon tetrachloride, and methyl ethyl ketone to remove the polystyrene microsphere template, so as to prepare lead dioxide-carbon nanotube adsorptive electrochemical submicroelectrodes following the same method as that in Example 1.

The above description is merely a schematic description of the present invention and implementations thereof, and is not restrictive. The embodiment only shows one of the implementations of the present invention, and the actual structure is not limited to thereto. Therefore, similar structures and embodiments designed by a person of ordinary skill in the art as inspired by the disclosure herein without departing from the spirit of the present invention and without creative efforts shall fall within the protection scope of the present invention.

What is claimed is:

1. A method for preparing a lead dioxide-carbon nanotube adsorptive electrochemical submicroelectrode, comprising: settling a spherical template adhered with carbon nanotubes down to a substrate to form a film, then preparing a lead dioxide active layer in the gaps between the spherical template by electrodeposition, and finally dissolving the template to obtain the lead dioxide-carbon nanotube adsorptive electrochemical submicroelectrode.

2. The method for preparing a lead dioxide-carbon nanotube adsorptive electrochemical submicroelectrode according to claim 1, wherein the substrate is one selected from antimony tin oxide conductive glass, a titanium plate, foamed titanium, foamed nickel, and a graphite plate.

3. The method for preparing a lead dioxide-carbon nanotube adsorptive electrochemical submicroelectrode according to claim 2, comprising the following steps:
   Step 1: mixing a polystyrene dispersion and a carbon nanotube dispersion; and
   heating, to obtain a mixed dispersion with carbon nanotubes adhered to the surface of the polystyrene microsphere template;
   Step 2: dripping the mixed dispersion in Step 1 on the surface of the antimony tin oxide conductive glass, and drying, to allow the polystyrene microsphere template adhered with carbon nanotubes to form a thin film;
   Step 3: preparing a lead dioxide active layer in the gaps between the polystyrene microsphere template in the film in Step 2 by electrodeposition; and
   Step 4: dissolving the polystyrene microsphere template in an organic solvent to obtain the lead dioxide-carbon nanotube adsorptive electrochemical submicroelectrode.

4. The method for preparing a lead dioxide-carbon nanotube adsorptive electrochemical submicroelectrode according to claim 1, wherein the spherical template is one or more selected from polystyrene microspheres and polyacrylic acid microspheres.

5. The method for preparing a lead dioxide-carbon nanotube adsorptive electrochemical submicroelectrode according to claim 4, comprising the following steps:
   Step 1: mixing a polystyrene dispersion and a carbon nanotube dispersion; and heating, to obtain a mixed dispersion with carbon nanotubes adhered to the surface of the polystyrene microsphere template;
   Step 2: dripping the mixed dispersion in Step 1 on the surface of the antimony tin oxide conductive glass, and drying, to allow the polystyrene microsphere template adhered with carbon nanotubes to form a thin film;
   Step 3: preparing a lead dioxide active layer in the gaps between the polystyrene microsphere template in the film in Step 2 by electrodeposition; and
   Step 4: dissolving the polystyrene microsphere template in an organic solvent to obtain the lead dioxide-carbon nanotube adsorptive electrochemical submicroelectrode.

6. The method for preparing a lead dioxide-carbon nanotube adsorptive electrochemical submicroelectrode according to claim 3, comprising the following steps:
   Step 1: mixing a polystyrene dispersion and a carbon nanotube dispersion; and
   heating, to obtain a mixed dispersion with carbon nanotubes adhered to the surface of the polystyrene microsphere template;
   Step 2: dripping the mixed dispersion in Step 1 on the surface of the antimony tin oxide conductive glass, and drying, to allow the polystyrene microsphere template adhered with carbon nanotubes to form a thin film;
   Step 3: preparing a lead dioxide active layer in the gaps between the polystyrene microsphere template in the film in Step 2 by electrodeposition; and
   Step 4: dissolving the polystyrene microsphere template in an organic solvent to obtain the lead dioxide-carbon nanotube adsorptive electrochemical submicroelectrode.

7. The method for preparing a lead dioxide-carbon nanotube adsorptive electrochemical submicroelectrode according to claim 6, wherein the weight ratio of polystyrene and carbon nanotube in the mixed dispersion in Step 1 is (1-3):1; and/or
   the heating temperature after mixing the polystyrene and carbon nanotubes in Step 1 is 80-180° C., and the heating time is 10-60 min.

8. The method for preparing a lead dioxide-carbon nanotube adsorptive electrochemical submicroelectrode according to claim 7, wherein the weight fractions of the polystyrene dispersion and the carbon nanotube dispersion in Step 1 are the same, and within the range of 0.1 to 1%.

9. The method for preparing a lead dioxide-carbon nanotube adsorptive electrochemical submicroelectrode according to claim 7, wherein in Step 2, the mixed dispersion is dripped on the surface of the antimony tin oxide conductive glass in an amount of 0.1-1 mL/cm$^2$; and/or
   the drying temperature in Step 2 is 40-80° C., and the drying time is 0.5-2 hrs; and/or in Step 3, the electrodeposition current is 5-30 mA/cm$^{-2}$, the electrodeposition time is 5-30 min, and the temperature is 30-70° C.; and/or the organic solvent in Step 4 is one selected from tetrachloroethane, styrene, isopropane, benzene, chloroform, xylene, toluene, carbon tetrachloride, or methyl ethyl ketone.

* * * * *